(12) United States Patent
Alavudin

(10) Patent No.: US 9,439,028 B2
(45) Date of Patent: Sep. 6, 2016

(54) METHOD AND APPARATUS FOR MOUSE WITH INTEGRATED MASS MEMORY

(71) Applicant: Intel IP Corporation, Santa Clara, CA (US)

(72) Inventor: Jalvathi Alavudin, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 153 days.

(21) Appl. No.: 14/150,276

(22) Filed: Jan. 8, 2014

(65) Prior Publication Data

US 2015/0193359 A1    Jul. 9, 2015

(51) Int. Cl.
*G06F 3/00* (2006.01)
*G05B 19/00* (2006.01)
*H04W 4/00* (2009.01)
*H04B 1/715* (2011.01)

(52) U.S. Cl.
CPC .............. *H04W 4/008* (2013.01); *H04B 1/715* (2013.01); *H04B 2001/7154* (2013.01)

(58) Field of Classification Search
CPC ... G06F 12/0246; G06F 3/0685; G06F 21/83
See application file for complete search history.

(56) References Cited

U.S. PATENT DOCUMENTS

| 7,664,961 | B2 * | 2/2010 | Blattner | G06F 3/03543 713/182 |
|---|---|---|---|---|
| 2007/0016957 | A1 * | 1/2007 | Seaward | G06F 3/03543 726/26 |
| 2007/0057763 | A1 * | 3/2007 | Blattner | G06F 3/03543 340/5.52 |

* cited by examiner

*Primary Examiner* — Hyun Nam
(74) *Attorney, Agent, or Firm* — SLGIP

(57) ABSTRACT

In one embodiment, the disclosure is directed to an integrated mouse and mass memory storage device (herein, memory storage device). In another embodiment, the disclosure is directed to a Bluetooth mouse having an integrated memory storage device. In still another embodiment, the disclosure relates to a controller for transmitting one or more storage data packets along with one or more mouse data packets from an BT mouse having an integrated mass memory storage.

25 Claims, 8 Drawing Sheets

US 9,439,028 B2

METHOD AND APPARATUS FOR MOUSE WITH INTEGRATED MASS MEMORY

BACKGROUND

1. Field

The disclosure relates to a method, system and apparatus for a computer mouse having mass storage capacity. Specifically, the disclosure relates to an integrated wireless mouse with mass storage capacity for storing data unrelated to the mouse's normal operations.

2. Description of Related Art

Wireless computer mice are ubiquitous. A wireless mouse connects to the computer and other digital devices through a common port. A common type of wireless mouse is a radio frequency (RF) device. Such RF devices may typically operate at 27 MHz and have a range of about 6 feet. More advanced RF mice, operating for example at 2.4 GHz, provide a longer range of about 33 feet. These mice provide faster transmission with less interference. Operating multiple RF mice in close proximity can result in crosstalk. Crosstalk may interfere with device operation as receivers can inadvertently act on a different mouse's transmissions.

Bluetooth (BT) technology overcomes the crosstalk problem of the conventional RF mice. Bluetooth devices operate in the 2.4 GHz range using RF technology. The BT technology avoids interference among multiple peripherals through spread-spectrum frequency hopping. Certain BT devices use adaptive frequency hopping which provides frequency hopping techniques for avoiding interference with other 2.4 GHz communication devices. A BT receiver can accommodate multiple BT peripherals simultaneously. Conventional BT devices have a range of about 33 feet.

Portable storage devices are also ubiquitous. A portable storage device such as a Universal Serial Bus (USB) drive storage or the so-called thumb drive enable external data storage. A portable storage device can connect to a digital processor (e.g., a computer) through a common port and enables data transfer between the devices. Conventionally, the connection is physically made through a USB port.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

In one embodiment, the disclosure is directed to an integrated mouse and mass memory storage device (interchangeably, memory circuit). The mouse memory circuit can be a remote storage device for storing computer data. The mouse memory circuit may store data unrelated to the normal mouse operations. In another embodiment, the disclosure is directed to a BT mouse having an integrated memory circuit. In still another embodiment, the disclosure relates to a controller for communicating one or more storage data packets along with one or more mouse data packets. The controller can take the form of hardware, software, firmware or of a combination thereof. For example, the controller can define one or more microprocessor circuits for executing instructions to transmit mouse data packets along with storage data packets to an external device.

Figure 1:
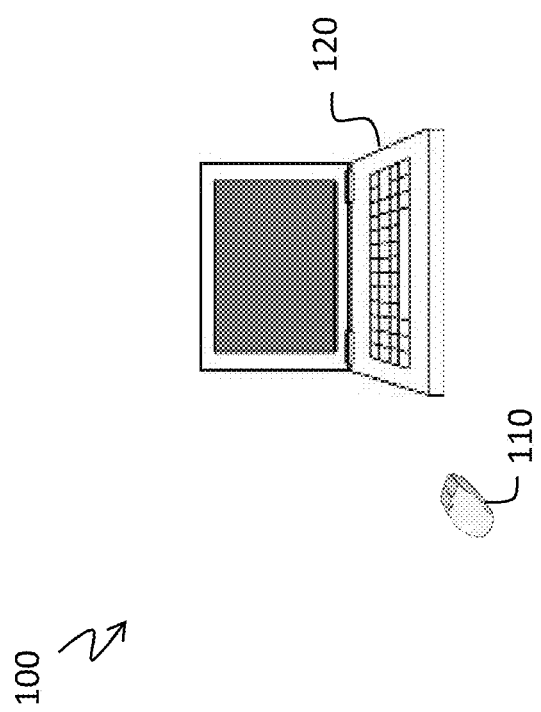
FIG. 1 illustrates an exemplary environment for implementing an embodiment of the disclosure.

FIG. 1 illustrates an exemplary environment for implementing an embodiment of the disclosure. System 100 of FIG. 1 includes laptop computer 120 and mouse 110. Laptop computer 120 is an exemplary device and may be interchanged for any processing system. For example, laptop 120 can be a desktop computer, a server, a tablet computer or any other device using a mouse as a peripheral device.

Mouse 110 can comprise a mouse processor (not shown) for processing and executing normal mouse operations including, exchanging cursor position information with laptop 120. According to one embodiment, mouse 110 may comprise a mass data storage (not shown) in the form of a memory circuit (not shown). Mouse 110 may also comprise one or more data storage processors (not shown) for managing the memory circuit (not shown). Mouse 110 integrates conventional mouse processing capabilities with mass data storage capacity thereby eliminating the need for an additional thumb drive or other external storage devices connecting to the laptop's USB port. The data to be stored can be transmitted to the BT mouse wirelessly without interrupting normal mouse operations.

Mouse 110 can be a wireless mouse configured for RF communication with laptop 120. In one embodiment of the disclosure, mouse 110 comprises a transceiver for communicating wirelessly with laptop 120. The communication between mouse 110 and laptop 120 may be by way of a proximity transport communication mechanism, such as by way of BT communication, for example, at the 2.4 GHz range, or it may be by way of another wireless communication protocol as would be recognized by a skilled person.

Figure 2:
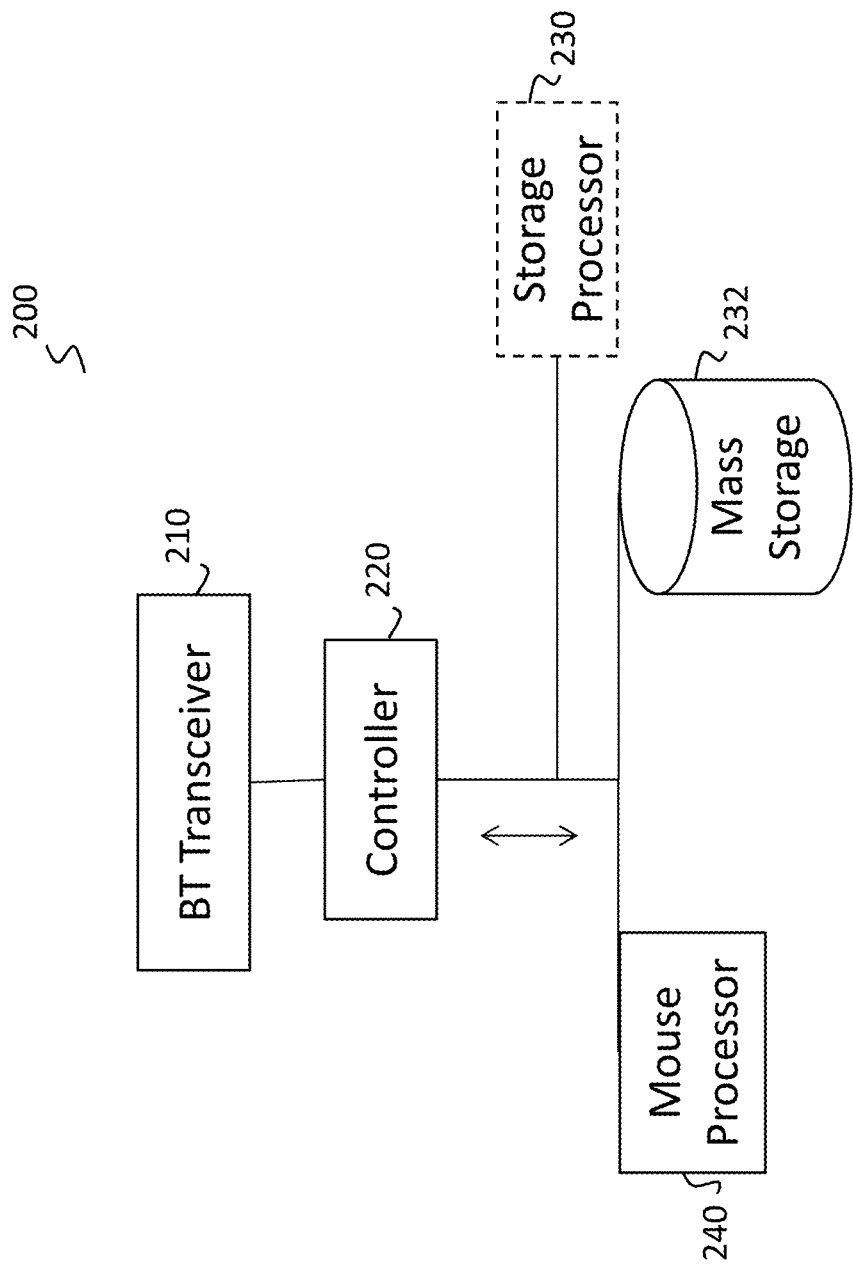
FIG. 2 is an exemplary system according to one embodiment of the disclosure.

FIG. 2 is an exemplary system according to one embodiment of the disclosure. In one embodiment, device 200 can be a BT mouse. Device 200 includes BT transceiver 210, controller 220, mouse processor 240 and mass storage device 232. Device 200 may optionally include storage processor 230.

BT transceiver can define any conventional BT device capable of communication with another BT device (e.g., laptop 120). BT transceiver 210 transmits outbound signals from controller 220. BT transceiver 210 also directs inbound signals to controller 220 for processing. BT transceiver 210 may comprise front-end radio processing capability to receive a digital data stream from controller 220 and transmit the information in analog format suitable for RF communication. Conversely, BT transceiver 210 can receive inbound data signals from an external device (e.g., laptop 120), convert the signal to digital data and communicate the digital data to controller 220.

Controller 220 can be embodied in any of a hardware, software, system-on-chip, firmware or a combination thereof. For example, controller 220 may include a microprocessor for executing instructions consistent with the disclosure. Controller 220 may operate on both inbound and outbound data. In an alternative embodiment, dedicated controllers can be associated with each of the inbound and outbound data streams. In still another embodiment, controller 220 may include multiple modules where a first module processes inbound data and a second module processes outbound data.

In the inbound mode, controller 220 may receive data packets from BT transceiver 210 and separate the packets according to the data content. For example, data packets may be directed to normal mouse operation (mouse data packets) or they may be directed to non-mouse operations (e.g., non-mouse data for external storage). Controller 220 may direct mouse data packets to mouse processor 240 while directing storage data packets to storage processor 230 and/or mass storage circuit 232. Mouse processor 240 may use the mouse data packets to execute normal mouse operation (e.g., cursor navigation on laptop 120). In an alternative embodiment of the disclosure, the function of mouse processor 240 may be combined with that of controller 220, in this way eliminating the need for the mouse processor 240. In this last embodiment, the mouse operations may be executed directly by controller 220.

Storage data packets may be received directly at mass storage circuit 232 or they may be received at storage processor 230. Storage processor 230 may receive storage data packets and instruct storage circuit 232 to store the data. In an alternative embodiment of the disclosure, the function of storage processor 230 may be combined with that of controller 220 which would render storage processor 230 unnecessary. In this last embodiment, storage data packets may be directed from controller 220 to mass storage circuit 232.

In the outbound mode, controller 220 may receive data packets destined for the external device (e.g., laptop 120) and may form different packets according to the data contained in each packet. Controller 220 may arrange transmission of different packet types intermittently. That is, the controller may transmit a mouse data packet, wait until a response (or an acknowledgement) is received from the external device, and then send data packets directed to the storing operation. The combined data packets (and frames) may contain data packets of different formats and functions. The data packets may be communicated to BT transceiver 210 which may modulate the data with an analog carrier prior to transmitting the signal to the external device.

Figure 3:
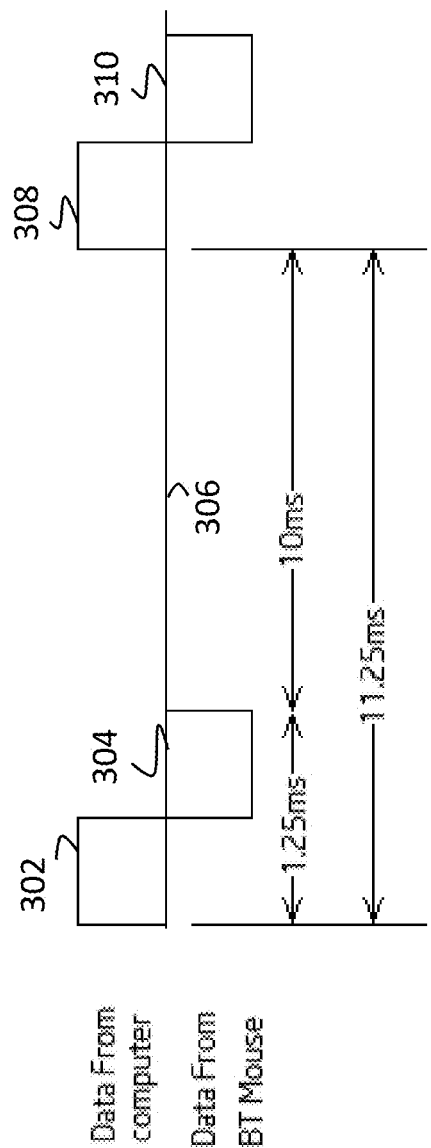
FIG. 3 illustrates conventional data transfer between a BT mouse and a computer.

FIG. 3 illustrates conventional data transfer between a BT mouse and a computer. In FIG. 3, packets 302, 304, 308 and 310 are BT packets. Specifically, data packets 302 and 308 may be POLL packets. POLL packets are conventionally used to obtain data from the recipient. POLL packets do not carry any data and are known as control packets. Packets 304 and 310 may have data for normal mouse operation. Data from the computer to the mouse (302, 308) are inbound data packets and data from the BT mouse to the computer (304, 310) are outbound data packets. The outbound mouse data packet may be a single slot packet because of its small size. Data packets 302, 304, 308 and 310 may have identical format and serve normal mouse operations.

Data packets 302 and 304 may also define a master/slave communication. For example, data packet 302 may be a POLL packet sent from computer to mouse. Data packet 304 can be the mouse's response to the POLL packet 302. POLL packet 302 may be sent periodically to interrogate the mouse. The POLL packet may be free of payload. Upon receiving a POLL packet, the slave responds with a packet even when the slave does not have any information to send. The return or response packet is an implicit acknowledgement of the POLL packet. If the mouse has no data in response to the POLL packet, packet 304 may be a NULL packet. The NULL packet has no payload and consists of the channel access code and a packet header. The total (fixed) length of a NULL packet is 126 bits. The NULL packet may be used to return link information to the source regarding the success of the previous transmission or the status of the receiver buffer. The NULL packet may not be acknowledged.

The master/slave communication is repeated with packets 308 and 310. A combination of data packets 302 and 304 takes about 1.25 msec. and can be defined as a frame. In BT applications, a frame can have two packets. That is, a frame may have two data packets, 2 control packets or one data packet and one control packet.

As stated, a mouse data frame (packets 302 and 304) may contain data for normal mouse operations (e.g. positional movement of a cursor on the computer). The mouse data frame can be followed by the so-called sniff period which is shown as segment 306 in FIG. 3. During the sniff period no data may be exchanged between the BT mouse and the computer. The sniff period for the BT mouse may for example be about 10 msec. Every 11.25 msec. a BT mouse frame may be exchanged followed by 10 msec. of no activity.

Figure 4:
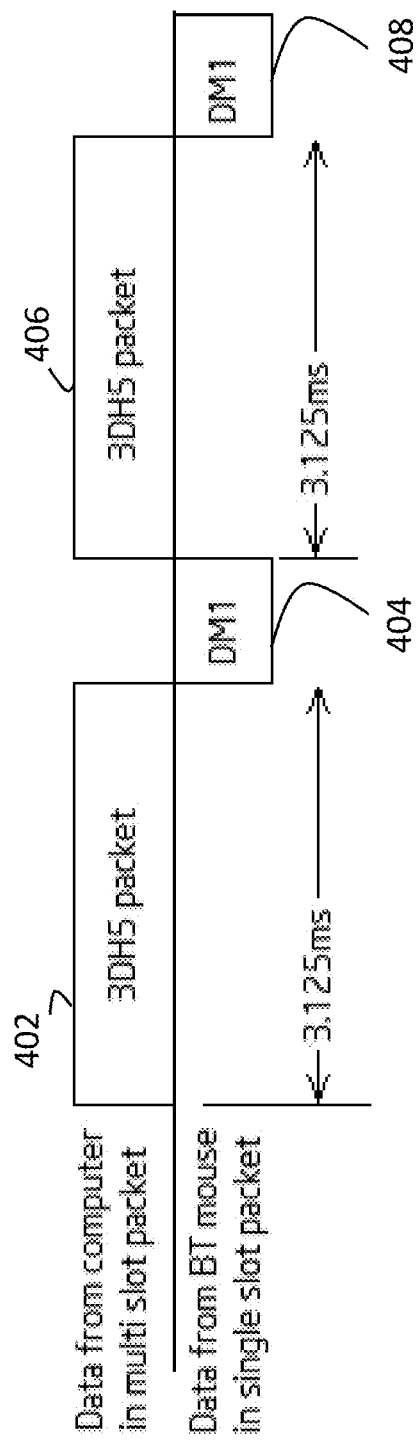
FIG. 4 illustrates data transfer from an external computer to an integrated mouse with memory circuit.

FIG. 4 illustrates data transfer from an external computer to an integrated mouse with memory circuit. The mouse can be a BT mouse. Specifically, the example of FIG. 4 shows inbound data from computer as BT multi-slot packets 402 and 406. A BT multi-slot packet is considered a single packet. Outbound data from BT mouse to the computer is shown as single slot packets 404 and 408. Single slot packets 404 and 408 may be NULL or may contain data. While, as would be recognized by the skilled person, BT single-slot packets use a 625-microsecond slot and can carry a given number of bytes, BT multi-slot packets can carry a significantly larger number of bytes in given multiples of the 625-microseconds, that is, at much higher data rates.

Inbound data is represented in FIG. 4 by way of example and not by way of limitation as 3DH5 packets, and mouse data packets for both inbound and outbound are presented by DM1 packets. DH5 stands for an enhanced data rate (EDR) packet at high data rate occupying 5 slots exhibiting a data rate of 2 Mb/s. The DM1 packet payload field may carry a maximum user payload of 17 bytes (136 bits), preceded by a one-byte header. It should be noted that the application of DH5 and DM1 are purely exemplary and illustrative. The disclosed principles can be applied equally to any data type. In one embodiment, the DM1 packet may carry data information only. The DM1 payload can have between 1 and 18 information bytes (including the 1-byte payload header) and a 16-bit cyclic redundancy check (CRC) code. The DM1 packet may occupy a single time slot. The information plus CRC bits are coded with a rate 2/3 Forward Error Correction (FEC). The payload header in the DM1 packet can be 1 byte long. The length indicator in the payload header specifies the number of user bytes (excluding payload header and the CRC code). This information is used by the BT mouse to send the data for mouse operation upon receiving the POLL packet from the computer. A DH5 packet is similar to the DM1 packet, except that the information in the payload is not FEC encoded. As a result, the DH5 packet has between 2 and 341 information bytes (including the 2-byte payload header) plus a 16-bit CRC code. The DH5 packet may occupy up to five time slots (i.e., 5×0.625 ms=3.125 ms).

A data frame can have two or more data packets. In an exemplary embodiment, a frame comprises two packets and each packet slot can be about 0.625 msec. Packets 402 and 406 may be used to communicate other data from the computer to the BT mouse. Data packets 402 and 406 may contain non-mouse information. For example, these packets may communicate data to be stored at the mass storage 232 (FIG. 2). In the exemplary representation of FIG. 4, the sniff mode has been replaced by non-mouse data transmission. The storage data packets from computer may be in 3DH5 format or other format according to application needs.

In an exemplary embodiment, an acknowledgement packet may be sent by the BT mouse to notify receipt of a packet. In another exemplary embodiment, the acknowledgement packet may comprise a single slot packet. The BT mouse has an opportunity to transmit data for normal BT mouse operation after every 3.125 msec. if there is active data transfer between the computer and the integrated mass storage circuit of the BT mouse.

Figure 5:
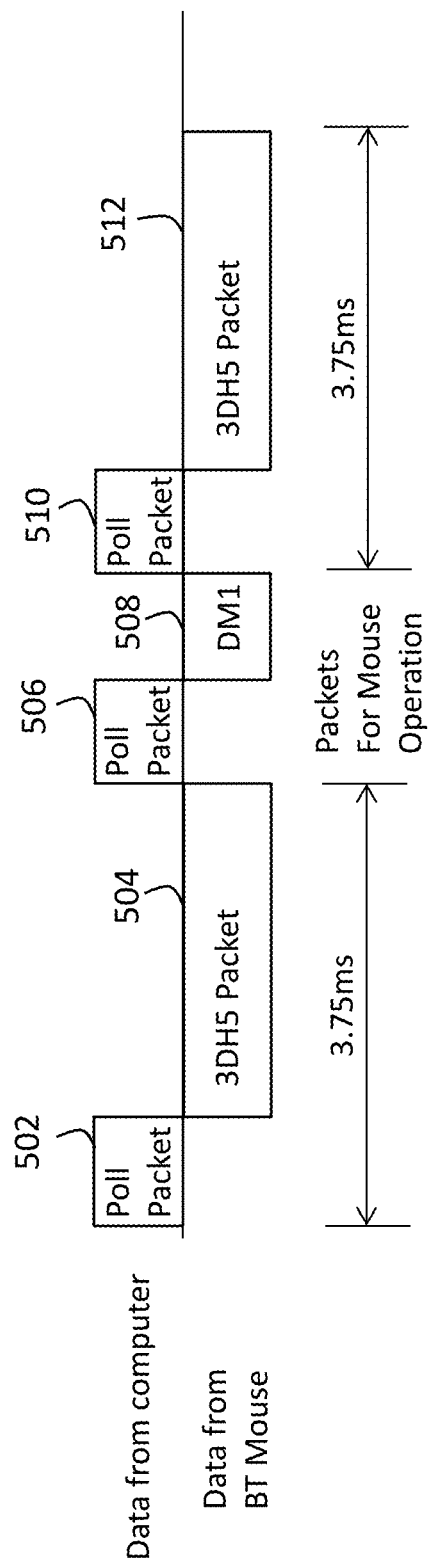
FIG. 5 illustrates data transfer from an integrated mouse with memory circuit to an external computer.

FIG. 5 illustrates data transfer from an integrated mouse with memory circuit to an external computer. The mouse can be a BT mouse with a mass memory circuit integrated therewith. In the example of FIG. 5, inbound data from computer starts with POLL packet 502. The POLL packet interrogates the mouse for normal mouse operation data. Responsive to POLL packet 502, the mouse may send a transmission acknowledging the POLL packet, a DM1 packet corresponding to the mouse operation or a data packet. In FIG. 5, the mouse responds with data frame 504. Data frame 504 may contain multi-slot storage data packet. On the next time interval, the computer sends POLL packet 506. The BT mouse responds to the POLL packet with DM1 packet 508 which contains information about the mouse's normal operations. The process continues when the computer sends POLL packet 510 to the BT mouse. The mouse, not having any mouse operation packet to report, responds with storage data packet 512.

As seen in FIG. 5, mouse data packets and storage data packets are transmitted intermittently. The data packet for mouse operation 508 is transmitted in response to POLL packet 506 when the BT Mouse has relevant information to report. If there is no data corresponding to the BT mouse operation, data transfer for the file operation will happen continuously as illustrated in packets 504 and 512.

Figure 6A:
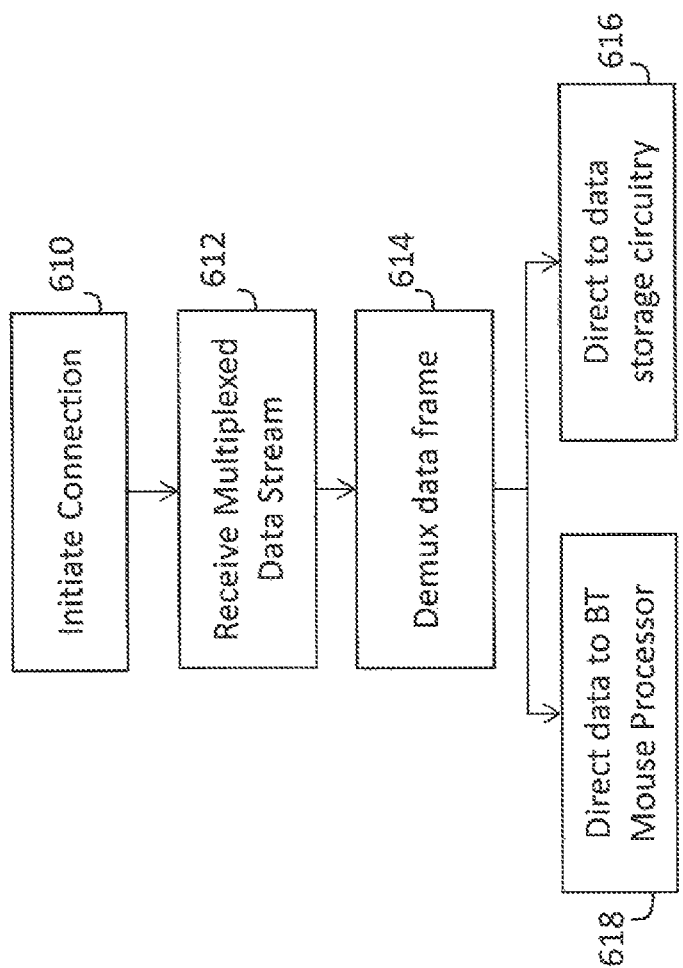
FIG. 6A is a flow diagram showing processing of inbound data at an exemplary BT mouse.

FIG. 6A is a flow diagram showing processing of inbound data at an exemplary BT mouse. At step 610, the mouse initiates communication with an external device (e.g., laptop computer). The process can comprise a conventional handshake. At step 612, the BT mouse receives a data stream from the computer. The data stream may include data packets for different functions. At step 614, the data packets in the data stream sorted based on criteria including type, format, size or function. At step 616, data storage packets are directed to the data storage processor and/or memory circuit. At step 618, mouse data packets are directed to the BT mouse processor.

Figure 6B:
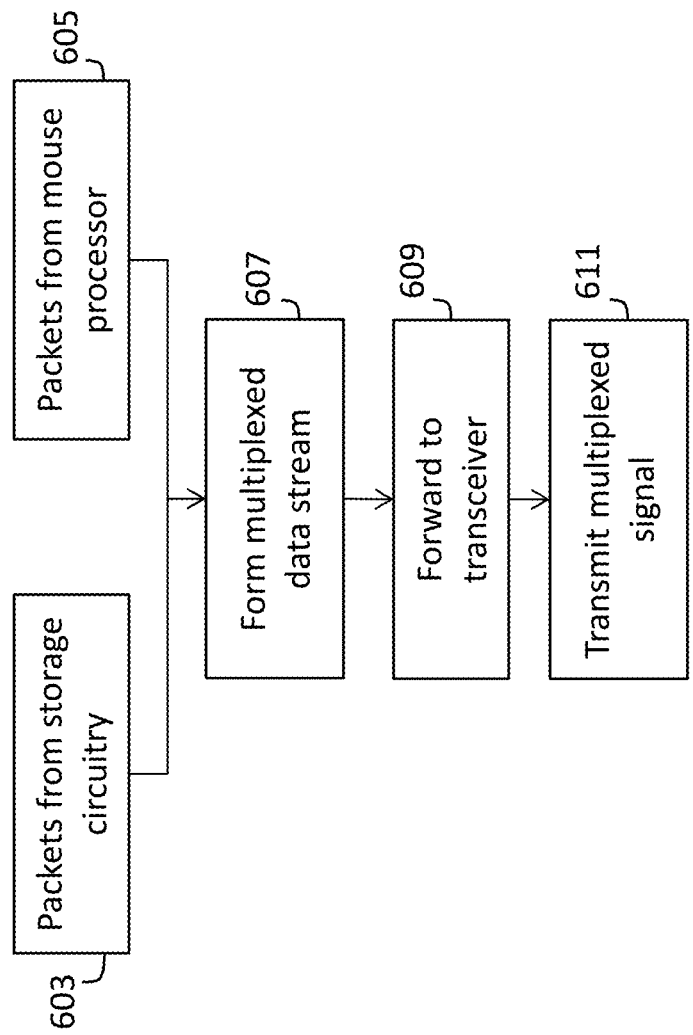
FIG. 6B is a flow diagram showing processing of outbound data from an exemplary BT mouse.

FIG. 6B is a flow diagram showing processing of outbound data from an exemplary BT mouse. Here, data storage packets 603 are from the data storage circuit. Mouse data packets 605 are from the BT mouse processor. At step 607, a data stream is formed. The data stream may include data packets of different type and or different functions. The data stream may also comprise data frames. At step 609, the data stream is forwarded to a transceiver for modulating into an analog signal. At step 611, the analog signal containing the outbound data is transmitted to the external device.

Figure 7:
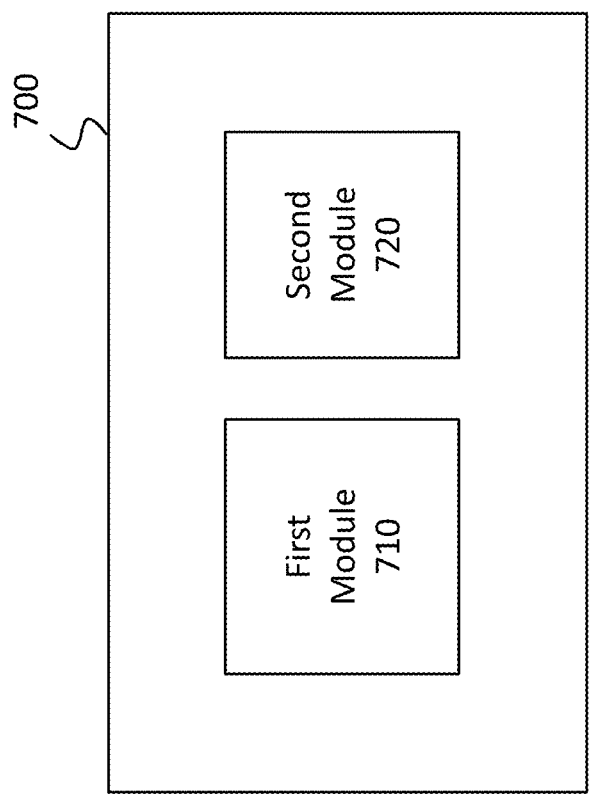
FIG. 7 is a schematic representation of a device according to one embodiment of the disclosure.

FIG. 7 is a schematic representation of a device according to one embodiment of the disclosure. Specifically, FIG. 7 shows controller 700 having first module 710 and second module 720. Controller 700 may comprise a hardware, software, firmware, a system on chip or any combination thereof. Similarly, each of first module 710 or second module 720 may comprise a hardware, software, firmware, a system on chip or any combination thereof. First module 710 and second module 720 may be integrated into controller 700.

Controller 700 can be configured to receive a data stream having first data packets and second data packets. First data packets may inform normal operation of a BT mouse while second data packets may inform operation of a function unrelated to the mouse. For example, the second data packets may govern storing data on an external mass storage device. The external mass storage device may be integrated with the BT mouse.

First module 710 can be configured to receive the plurality of first data packets from the controller and direct the first data packets to an appropriate receiver. For example, if the first data packets define mouse data packets, first module may direct the first data packet to a mouse processor. Alternatively, first module 710 may define a BT mouse processor. In this embodiment, first module 710 receives and implements first data packets. Similarly, second module 720 can be configured to receive the plurality of second data packets from the controller. If the second data packets define storage data packets, second module 720 may direct the second data packets to a storage processor and/or memory circuit. Alternatively, second module 720 may define a storage processor and/or memory circuit. In this embodiment, second module 720 receives and stores (and/or responds to) the second data packets. The device of FIG. 7 may be combined with other devices to form a system, similar to those disclosed in FIG. 1.

The following examples pertain to further embodiments of the disclosure. Example 1 includes a method for multimode operation of a mouse, comprising: receiving a mouse data packet and at least one storage data packet at the mouse; executing mouse operation as a function of the mouse data packet; and storing the at least one data packet at an integrated mouse memory circuit.

Example 2 includes the method of example 1, further comprising transmitting one of a NULL packet or a data packet in response to receiving the mouse data packet.

Example 3 includes the method of example 1, further comprising transmitting one or more data frame acknowledging the data packet.

Example 4 includes the method of example 1, further comprising receiving the mouse data packet and the storage data packet intermittently.

Example 5 includes the method of example 1, further comprising receiving a storage data frame having a plurality of storage data packets.

Example 6 includes the method of example 1, further comprising receiving a POLL packet.

Example 7 includes the method of example 6, further comprising responding to the POLL packet with one of a NULL packet or the mouse data packet.

Example 8 includes the method of example 1, wherein receiving comprises receiving by way of a wireless proximity communication transport mechanism.

Example 9 includes the method of example 8, wherein the wireless proximity communication transport mechanism includes the Bluetooth (BT) protocol.

Example 10 includes a device comprising: a first module configured to receive a mouse data packet and execute a mouse operation using the mouse data packet; and a second module configured to receive and store at least one storage data packet at an integrated mouse memory circuit.

Example 11 includes the device of example 10, further comprising a controller configured to receive and direct the mouse data packet and the storage data packet to the first module and the second module, respectively.

Example 12 includes the device of example 10, wherein the controller is further configured to receive a first response packet from the first module and a second response packet from the second module.

Example 13 includes the device of example 10, wherein the controller is further configured to transmit the first and the second response packets.

Example 14 includes the device of example 10, wherein the at least one storage data packet defines a data frame having a plurality of data storage packets.

Example 15 includes the device of example 10, wherein the controller is integrated with at least one of the first or the second modules.

Example 16 includes a system comprising: a transceiver; a memory circuit; and a controller to communicate with the transceiver and the memory circuit, the controller configured to receive a mouse data packet and a storage data packet, the transceiver configured to execute a mouse operation using the mouse data packet.

Example 17 includes the system of example 16, wherein the controller is further configured to direct the data storage packet to the memory circuit for storage.

Example 18 includes the system of example 16, wherein the transceiver, the memory circuit and the controller define an integrated system.

Example 19 includes the system of example 16, wherein the controller is further configured to send an outbound mouse data packet to the transceiver.

Example 20 includes the system of example 16, wherein the storage data packet comprises data unrelated to mouse operation.

Example 21 includes the system of example 16, wherein the transceiver receives the mouse data packet and the storage data packets intermittently.

Example 22 includes a non-transitory computer-readable storage device containing a set of instructions to cause a computer to perform a process comprising: receive a mouse data packet and at least one storage data packet; execute mouse operation as a function of the mouse data packet; and store the at least one data packet at an integrated mouse memory circuit.

Example 23 includes the non-transitory computer-readable storage device of example 22, wherein the set of instructions further cause the computer to communicate one of a NULL packet or a data packet in response to receiving the mouse data packet.

Example 24 includes the non-transitory computer-readable storage device of example 22, wherein the set of instructions further cause the computer to transmit one or more data frame acknowledging the data packet.

Example 25 includes the non-transitory computer-readable storage device of example 22, wherein the set of instructions further cause the computer to receive the mouse data packet and the storage data packet intermittently.

Example 26 includes the non-transitory computer-readable storage device of example 22, wherein the set of instructions further cause the mouse to receive a POLL packet and respond to the POLL packet with one of a NULL packet or a mouse data packet.

While the principles of the disclosure have been illustrated in relation to the exemplary embodiments shown herein, the principles of the disclosure are not limited thereto and include any modification, variation or permutation thereof.

What is claimed is:

1. A method to operate a wireless computer mouse, comprising:
   receiving a mouse data packet and at least one storage data packet, the mouse data packet relating to mouse positioning operation relative to an external device and the storage data packet comprising data unrelated to mouse positioning operation received from the external device;
   executing a mouse operation as a function of the mouse data packet; and
   storing the at least one storage data packet at an integrated mouse memory circuit;
   wherein the mouse data packet and the storage data packet are received as part of the same frame from the external device and are demultiplexed from the data frame.

2. The method of claim 1, further comprising transmitting one of a NULL packet or a data packet in response to receiving the mouse data packet.

3. The method of claim 1, further comprising transmitting one or more packet acknowledging receipt of at least one of the mouse data packet or the storage data packet.

4. The method of claim 1, further comprising receiving the mouse data packet and the at least one storage data packet intermittently.

5. The method of claim 4, wherein the storage data frame comprises a plurality of storage data packets to be stored on a data storage processor integrated with the mouse.

6. The method of claim 1, further comprising receiving a POLL packet.

7. The method of claim 1, further comprising responding to the POLL packet with one of a NULL packet or the mouse data packet.

8. The method of claim 1, wherein receiving comprises receiving by way of a wireless proximity communication transport mechanism.

9. The method of claim 8, wherein the wireless proximity communication transport mechanism includes the Bluetooth (BT) protocol.

10. A device comprising:
    a first module configured to receive a mouse data packet and execute a mouse operation using the mouse data packet, the mouse data packet including data for mouse positioning operation relative to an external device; and
    a second module configured to receive and store at least one storage data packet at an integrated mouse memory circuit, the storage data packet including data unrelated to mouse positioning operation received from the external device;
    wherein the mouse data packet and the storage data packet are received as part of the same frame from the external device and are demultiplexed from the data frame.

11. The device of claim 10, further comprising a controller configured to receive and direct the mouse data packet and the storage data packet to the first module and the second module, respectively.

12. The device of claim 10, wherein the controller is further configured to receive a first response packet from the first module and a second response packet from the second module.

13. The device of claim 10, wherein the controller is further configured to transmit the first and the second response packets.

14. The device of claim 10, wherein the data frame further comprises a plurality of data storage packets.

15. The device of claim 10, wherein the controller is integrated with at least one of the first or the second modules.

16. A system comprising:
a transceiver including one or more antennas;
a memory circuit; and
a controller to communicate with the transceiver and the memory circuit, the controller configured to receive a mouse data packet and a storage data packet, the transceiver configured to execute a mouse operation using the mouse data packet
wherein the mouse data packet relates to mouse positioning operation relative to an external device and the storage data packet includes data unrelated to mouse positioning operation received from the external device, and wherein the mouse data packet and the storage data packet are received as part of the same frame from the external device and are demultiplexed from the data frame.

17. The system of claim 16, wherein the controller is further configured to direct the data storage packet to the memory circuit for storage after the data frame is demultiplexed.

18. The system of claim 16, wherein the transceiver, the memory circuit and the controller define an integrated system.

19. The system of claim 16, wherein the controller is further configured to send an outbound mouse data packet to the transceiver.

20. The system of claim 16, wherein the transceiver receives the mouse data packet and the storage data packets intermittently.

21. A non-transitory computer-readable storage device containing a set of instructions to cause a computer to perform a process comprising: receive a mouse data packet and at least one storage data packet; execute mouse operation as a function of the mouse data packet; and store the at least one data packet at an integrated mouse memory circuit; wherein the mouse data packet relates to mouse positioning operation relative to an external device and the storage data packet includes data unrelated to mouse positioning operation received from the external device, and wherein the mouse data packet and the storage data packet are received as part of the same frame from the external device and are demultiplexed from the data frame.

22. The non-transitory computer-readable storage device of claim 21, wherein the set of instructions further cause the computer to communicate one of a NULL packet or a data packet in response to receiving the mouse data packet.

23. The non-transitory computer-readable storage device of claim 21, wherein the set of instructions further cause the computer to transmit one or more data frame acknowledging the data packet.

24. The non-transitory computer-readable storage device of claim 21, wherein the set of instructions further cause the computer to receive the mouse data packet and the storage data packet intermittently.

25. The non-transitory computer-readable storage device of claim 21, wherein the set of instructions further cause the mouse to receive a POLL packet and respond to the POLL packet with one of a NULL packet or a mouse data packet.

* * * * *